(12) United States Patent
Buckingham et al.

(10) Patent No.: US 8,205,522 B2
(45) Date of Patent: Jun. 26, 2012

(54) LINK ASSEMBLY WITH DEFINED BOUNDARIES FOR A SNAKE LIKE ROBOT ARM

(75) Inventors: Robert Oliver Buckingham, Abingdon (GB); Andrew Crispin Graham, Bristol (GB)

(73) Assignee: Oliver Crispin Robotics Limited (GB)

( * ) Notice: Subject to any disclaimer, the term of this patent is extended or adjusted under 35 U.S.C. 154(b) by 851 days.

(21) Appl. No.: 12/257,080

(22) Filed: Oct. 23, 2008

(65) Prior Publication Data

US 2009/0095112 A1 Apr. 16, 2009

Related U.S. Application Data

(63) Continuation-in-part of application No. 10/736,354, filed on Dec. 15, 2003, now Pat. No. 7,543,518, which is a continuation-in-part of application No. PCT/GB02/02649, filed on Jun. 12, 2002.

(51) Int. Cl.
*B25J 17/00* (2006.01)

(52) U.S. Cl. ............... 74/490.04; 901/15; 901/21

(58) Field of Classification Search ........ 74/469, 74/479, 490.01, 490.04, 490.05; 90/15, 21, 90/28, 29
See application file for complete search history.

(56) References Cited

U.S. PATENT DOCUMENTS

| 2,761,297 | A |   | 9/1956 | Buchsteiner |
|---|---|---|---|---|
| 2,765,930 | A | * | 10/1956 | Greer et al. ............ 901/28 |
| 3,162,214 | A |   | 12/1964 | Bazinet, Jr. |
| 3,266,059 | A |   | 8/1966 | Stelle |
| 3,274,850 | A |   | 9/1966 | Tascio |
| 3,275,850 | A |   | 9/1966 | Arseneau |
| 3,497,083 | A | * | 2/1970 | Anderson et al. ........... 901/28 |
| 3,504,902 | A |   | 4/1970 | Irwin |
| 4,393,728 | A |   | 7/1983 | Larson et al. |
| 4,440,031 | A |   | 4/1984 | De Fazio |
| 4,494,417 | A |   | 1/1985 | Larson et al. |
| 4,579,558 | A |   | 4/1986 | Ramer |
| 4,751,821 | A |   | 6/1988 | Birchard |
| 4,784,042 | A |   | 11/1988 | Paynter |
| 4,815,911 | A |   | 3/1989 | Bengtsson et al. |
| 4,977,790 | A |   | 12/1990 | Nishi et al. |
| 5,174,168 | A | * | 12/1992 | Takagi et al. ........... 74/479.01 |
| 5,297,874 | A |   | 3/1994 | Raines |
| 5,902,050 | A |   | 5/1999 | Balczun et al. |
| 6,170,990 | B1 |   | 1/2001 | Hawkins |

FOREIGN PATENT DOCUMENTS

| DE | 29902753 U1 | 6/1999 |
|---|---|---|
| GB | 2134483 A | 8/1984 |
| JP | 59134687 A | 8/1984 |
| WO | 02100608 A1 | 12/2002 |

OTHER PUBLICATIONS

International Search Report, PCT/GB02/02649, Sep. 25, 2002, 3 Pages. International Preliminary Examination Report, Sep. 15, 2003, 14 Pages.
International Preliminary Report on Patentability and Written Opinion of the International Searching Authority; PCT/GB2009/001308; Nov. 23, 2010; 6 pages.
International Search Report; PCT/GB2009/001308; Aug. 5, 2009; 2 pages.

* cited by examiner

*Primary Examiner* — James Pilkington
(74) *Attorney, Agent, or Firm* — St. Onge Steward Johnston & Reens LLC

(57) ABSTRACT

In a "tip following" robotic arm, the apertures through which control cables pass are arranged to ensure that the cables are maintained in contact with at least a part of the aperture, leading to a more stable and controllable arrangement.

16 Claims, 13 Drawing Sheets

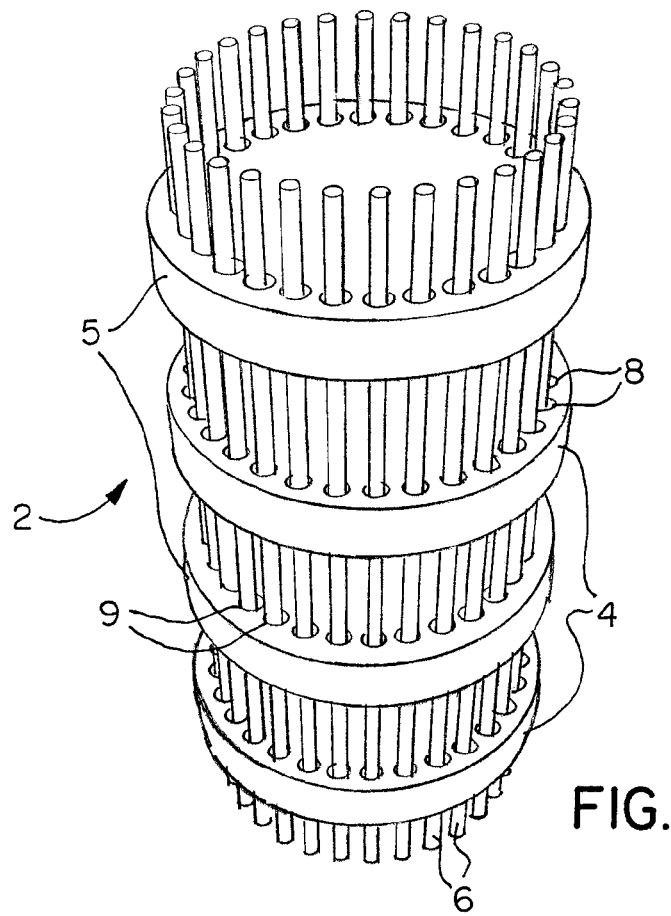
FIG. 2
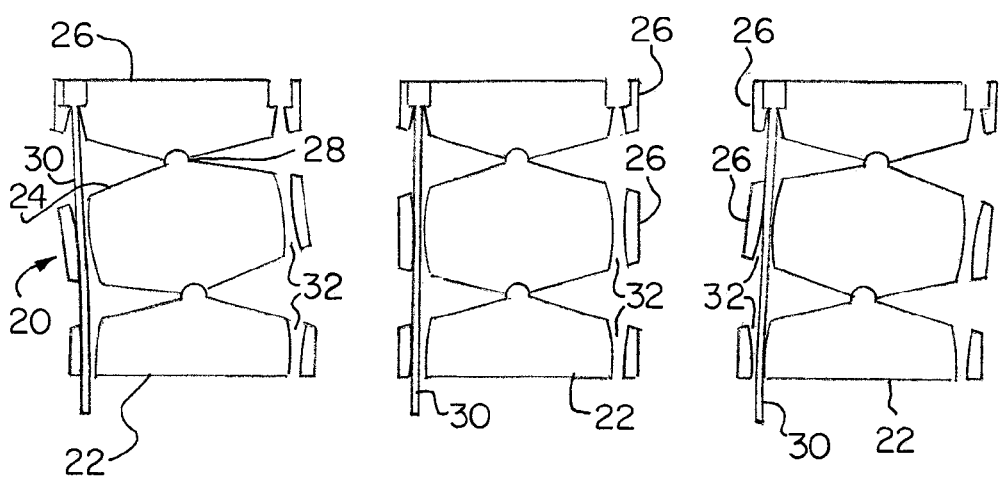
FIG. 1a
(PRIOR ART)
FIG. 1b
(PRIOR ART)
FIG. 1c
(PRIOR ART)

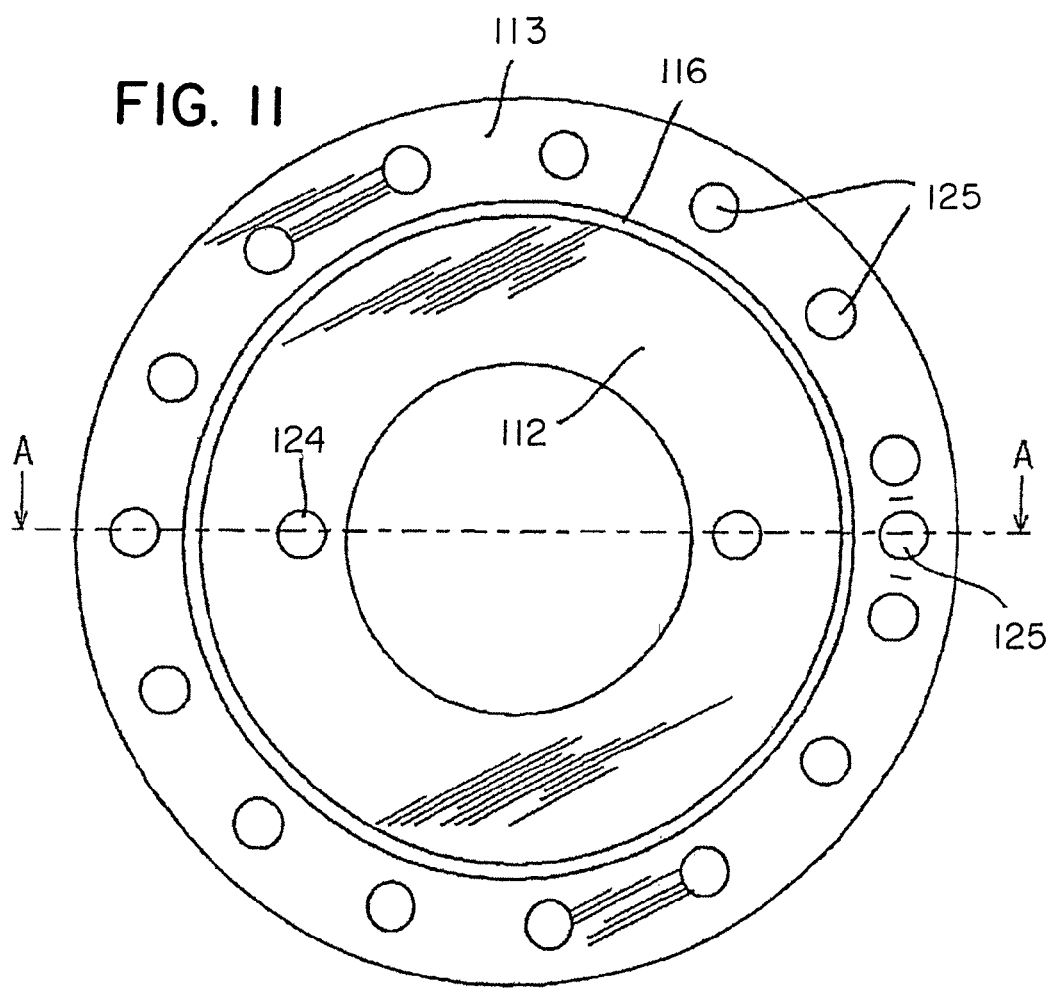
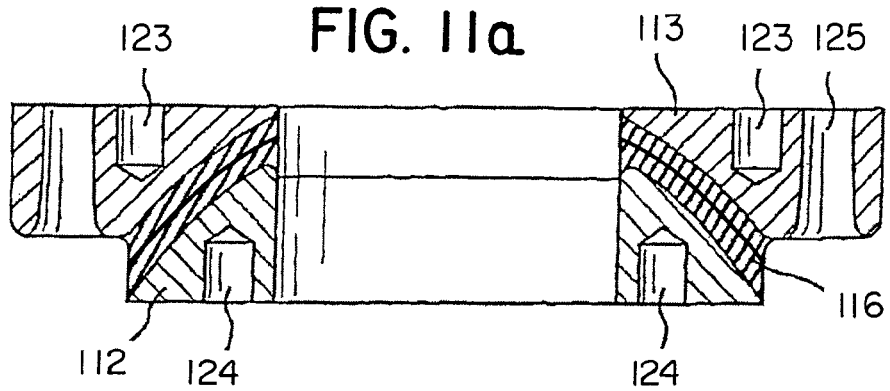

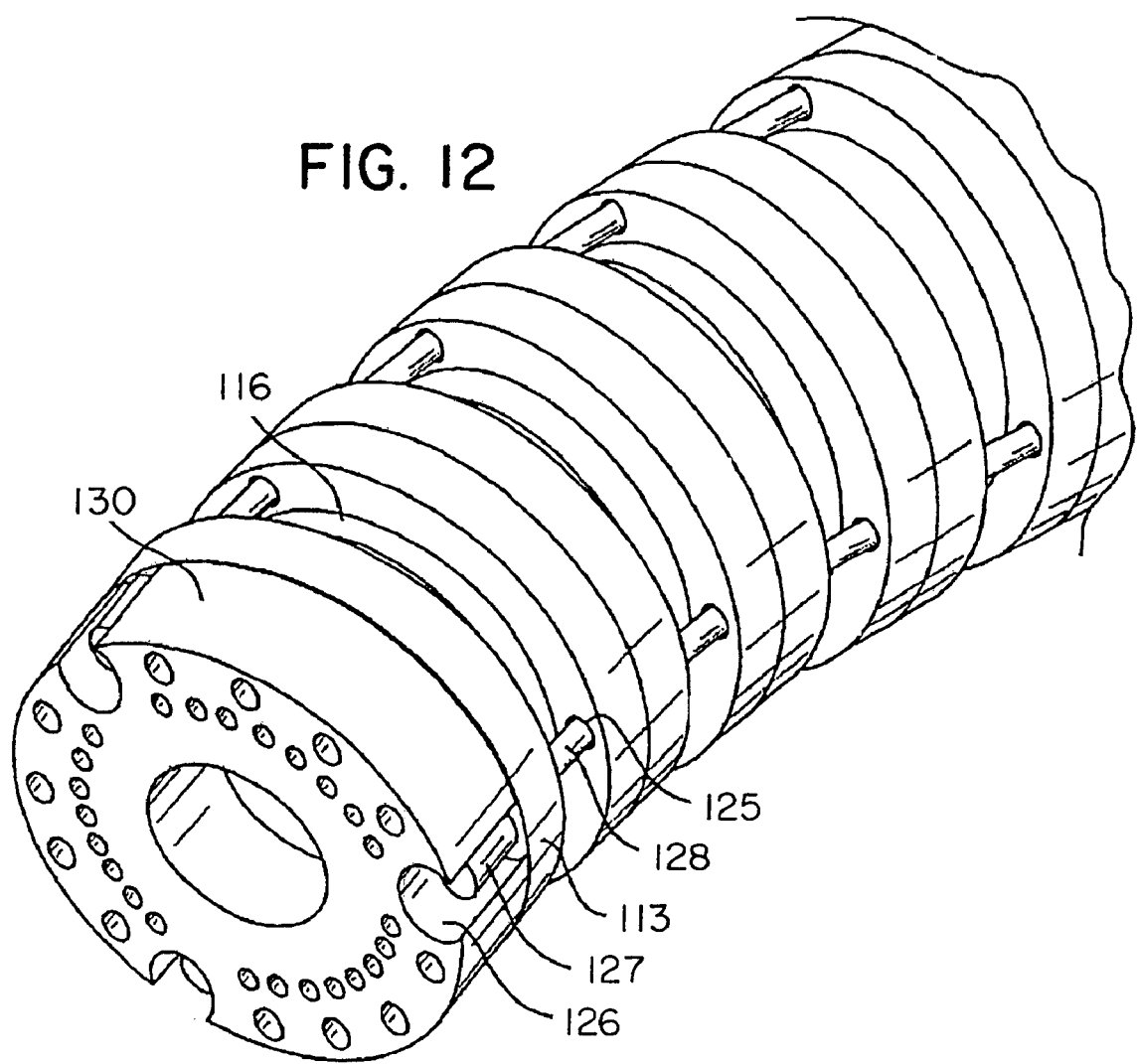

LINK ASSEMBLY WITH DEFINED BOUNDARIES FOR A SNAKE LIKE ROBOT ARM

CROSS-REFERENCE TO RELATED APPLICATIONS

This application is a continuation-in-part of patent application Ser. No. 10/736,354 filed Dec. 15, 2003 now U.S. Pat. No. 7,543,518, which is a continuation of International Patent Application No. PCT/GB02/02649 filed Jun. 12, 2002, which designates the United States and claims priority of British Application No. 0114406.2 filed Jun. 13, 2001.

FIELD OF THE INVENTION

This invention relates to robotic arms of the type used to reach a remote work site via a convoluted path; for example inside an engine or a human body.

BACKGROUND OF THE INVENTION

A known type of robotic arm is able to follow a path to a work site with the body of the arm remaining on the path. This is known as "tip following". That is, the body of the arm follows the path taken by the tip, in a snake like manner. This may include, for example, an apparatus comprising a support arm for a work head that is to be positioned at a location. This may further include operating means for operational control of the work head and control means for controlling the attitude and positioning of the arm wherein the support arm comprises at least one segment having a plurality of links, each link being articulated with respect to its neighbor and means for controlling the position and/or attitude of the segment relative to a datum thereby enabling the arm to follow and adapt to a predetermined path within the machine from entry in the machine housing to the work site. Each segment comprises a plurality of links, there being a degree of articulation between adjacent inks. By maintaining articulation of the links in each segment under tension, the spatial positioning of each segment may be controlled with precision to enable the arm to follow a convoluted path to guide the work tool into the machine. An arm of this type is as stated above, know as a "tip following" arm because of its ability to extend axially of itself in the manner of a snake and to flow around obstacles in order to follow a convoluted path. The tip may further carry a work took and for certain tasks, it is necessary for the arm to follow the path precisely, and for the tip to be steady and stable. If a process performed at the tip involves loads which are transmitted to the arm, the arm must also be appropriately stiff or the tip to remain steady. Examples of such tasks includes locating surgical tools at the tip of the arm for microscopic surgery through an incision or natural orifice of the body, or conducting repair work within a compressor of a jet engine An arm for performing this type of task is described in WO 02/100608. Such an arm typically comprises a plurality of sequentially arranged articulated links, with control cables passing from actuators located at the proximal end of the arm, through successive links to terminate each at a more distal control link, for controlling that link. For example, a set of three cables may terminate at a particular link at positions around the circumference of the link. Differential movement of the actuators of the set of cables terminating at a particular link exerts a moment on the link which results in a change of the arm shape. The links may be grouped together, with a group of passive links terminating in a control link is known as a segment, and an arm may have several such controllable segments. Alternatively, each link may be directly controlled. Typically, the apertures in the more proximal links through which the control cables pass are located near the periphery of each link. The actuators may be controlled by a computer control system to adjust the arm shape.

In order to provide a structure that is stable and can be manipulated precisely, it has previously been the thought that the cables should fit closely within the apertures passing through the various links. This is so that the links are restricted from moving in relation to the cables, so their position is more accurately determinable. If the cables are a loose fit within the apertures then, particularly when the arm is straight or passes through the straight position, it is possible that the links will be able to move in an uncontrolled or unpredictable manner. The device will therefore provide lower stiffness, and lower position accuracy, and may further exhibit hysteresis errors. However, because of engineering constraints, such as manufacturing tolerances, the need to push the cables through the apertures when the arm is constructed, the tendency of cables to change diameter with changing load, and the need to be able to move the cables within the apertures when the arm is in use, in practice it has been determined that the apertures should be provided slightly larger than the cable diameter. This, however, inevitably results in a small error in the positioning of the arm, which is difficult to calculate and take account of in controlling the arm shape.

SUMMARY OF THE INVENTION

Accordingly, what is desired then is an arm assembly that is stable and can be manipulated precisely.

It is also desired to provide an arm assembly in which the actual position of individual links may be accurately determined.

It is further desired to provide an arm assembly that exhibits relatively high stiffness and position accuracy, and avoids exhibiting hysteresis errors.

It is still further desired to provide an arm assembly in which apertures are provided slightly larger than the cable diameter, but further provides high position accuracy.

These and other objects are achieved in one embodiment, by the provision of a robotic arm having a plurality of sequentially arranged links, and a plurality of operating cables, in which each cable extends from a proximal end of the arm to terminate at one of the links for controlling that link, the cable passing through an aperture in each successive more proximal link, wherein the arm is configured such that each cable remains in contact with at least a part of the link at the boundary of each aperture through which it passes in use of the arm.

Thus the cables may better constrain link movement, even if the cables are not a close fit within the apertures, such that the position of the arm may be more accurately known or calculated, leading to more accurate control of the arm shape.

This may be achieved, for example, by the apertures in adjacent links being offset with respect to each other, either in the radial or in the circumferential direction. For example, the apertures through which a particular cable passes may alternate between a particular circumferential position and a position which is slightly offset circumferentially. Thus the cables follow a so-called zig-zag path and bear against alternate sides of each aperture. It is therefore possible when controlling the arm to know the cable and link position more accurately.

The computer control system may thus contain more precise geometric information forming a model of the arm, from which cable movements may be calculated for achieving the required arm shape. A more accurate geometric model of the cables and links may form the basis of a more accurate kinematics, statics and dynamics modeling. Forces that are exerted on links and cables from a variety of sources both internal and external may be modeled in order to calculate the shape of the arm given a known loading pattern.

Alternatively the apertures may be inclined with respect to the axis of the arm in alternately opposite directions. Thus the cable will bear against the one edge of the lower end of the aperture, and the opposite edge of the upper end of the aperture.

The boundary of the aperture may comprise, but is not limited to, a straight side, a curved side, or an angled side to name just a few configurations. Advantageously, the boundary of each aperture and/or each cable may be provided with a surface comprising low friction material. Alternatively, the boundary of the aperture may comprise a bearing. For example, a bearing in the form of spherical balls housed within a ball race embedded in each link (a so-called nano-bearing) may be used. In this embodiment, the advantage of reducing frictional forces is provided. Since frictional forces are difficult to model, this improves the accuracy of the model of the arm used by the control system for control of the arm.

Alternatively, friction may be dissipated in another embodiment by movement of the cables or the links. Thus, the arm may comprise a control system arranged to produce oscillating movement of cables. The oscillating movement may be in the axial or circumferential direction, or may be rotational movement. If circumferential or rotational movement of the cables is used to dissipate friction, this may be provided in one direction rather than, for example, oscillating, since such rotational movement does not directly affect the control of the position of the arm, which is rather affected by the lengths of the cables.

Such anti-friction control signals may be superimposed using the existing cable control system, or may be provided by an additional control system which may be located at points along the arm. For example, actuators for producing oscillation in the cables may be arranged on links along the length of the arm.

Alternatively, each or some of the links may be arranged to provide oscillating movement of the apertures. For example, each link may include a piezo actuator to produce oscillating movement in the aperture, for example by compressing and releasing the cable or by agitating it.

Producing relative movement between the cable and the aperture acts to release the cable from frictional adherence in the aperture, such that it runs more freely. This has the effect of equalizing the tension in the cables either side of a link. This process may be applied to all links at the same time, or gradually or sequentially along the length of the arm. Thus, the cable position is easier to determine, and distortions in the arm shape are alleviated.

An alternative approach to reducing friction is to rotate the arm. Thus the control system may be arranged to rotate or roll the arm around its own axis by a small amount either continuously or in an oscillating movement. This can be done in use of the arm without changing the position in space of the arm and the arm tip, or the shape of the arm. The control system may be arranged to do this simultaneously with producing advancing movement of the arm. In the situation where a tool is mounted on the end of the arm, the rolling movement of the arm may be counteracted by an equal and opposite roll of the joint between the tool and the arm tip, such that the tool remains in the same position. Alternatively, if the tool is arranged to produce an image (such as a camera), software may be used to counter-rotate the image. An advantage of this approach is that it reduces or evenly distributes wear on the cables which would otherwise occur where repetitive movements are carried out by the arm.

In still another alternative approach, it has been determined that by dispensing with springs as is known in the prior art and interposing instead a layer of rubber or elastomeric material either bonded or keyed to the two members constituting the articulation between adjacent links within a segment, the rubber can constitute a fixed frictional contact surface between the articulated components while at the same time providing the resilient shear capacity necessary to produce "stiffness" of the joint.

According to one aspect of the present invention, therefore, there is provided a link assembly for a robot arm or snake arm, which comprises first and second link members each adapted for limited movement one with respect to the other, and an elastomer disposed between the first and second members and bonded or keyed thereto the arrangement being such that movement between said first and second members results in shear movement within the elastomer means disposed between them.

The elastomer may comprise, for example, a natural or synthetic rubber or any other suitable resilient or elastomeric material. The elastomer is preferably disposed as a layer between the first and second link members. In one embodiment, the first and second members may be configured in a co-operating mating relationship and the elastomer may, be disposed between them as a thin layer such that a bending movement between the members products shear movement within the elastomer and reduces and/or eliminates any compressive movement as a result of the relative movement between the first and the second members. The elastomer may serve to produce axial stiffness and bending flexibility of the joint between the members.

It is preferred that the thickness of the layer is as thin as possible and layers of 1 mm or less have been found to be advantageous. The layer may be bonded to one or both of the members or may be keyed to one or both. Each surface contiguous a meter is preferably secured in operation so that relative movement between the members produces a shear movement within the elastomer. The thinness of the layer will reduce the tendency toward compression and will hence provide improved stability of the positioning of the component and will enhance the axial stiffness of each link articulation in the segment.

The elastomer means may comprise a plurality of layers of elastomer in which a rigid layer bonded or keyed to adjacent elastomer layers may serve to separate each elastomer layer from its neighbor. The elastomer may be a laminate and the interleaving or rigid layer between each layer of elastomer may be any rigid layer or material, which is bondable to or capable of being keyed to the elastomer. The interleaving layer should be stiff enough to reduce compressive movement of the elastomer to a minimum. Typical materials for the interleaving layer may be a thin metal layer, resin or glass fiber or may be a mat of either woven or unwoven carbon fiber or Kevlar.

The invention further includes a robotic arm containing at least one segment comprising a plurality of links in accordance with the invention, and control means for controlling the movement of the links within the segment wherein the control means maintains the links under tension or compression. The control means may be at least one wire extending from one end of the segment to the other.

In a preferred aspect, the control means may comprises three wires each extending from one end of the segment to the other whereby changing the tension in the wires one relative to the other, causes or allows the links to flex thereby controlling the movement of the segment. The wires are preferably tensioned to maintain the links under compression. The application of differential tension between the wires causes or allows the segment to move or bend.

By using elastomeric discs or bearings between each of the moving parts of each link, there is a significant reduction in friction and at the same time, the device becomes extremely easy to manufacture in bulk. Once tools and templates have been produced, the reproduction of large numbers becomes relatively easy. Segments made up of a significant number of links can be produced and the optimum control for each segment is 3 wires. While it is possible to dispense with perhaps one of the wires in a segment or at least one of the operating wires in a segment, it is preferred to use at least 3 control wires in order to obtain optimum manipulation of the segment. For a multi-segment arm, three sets of control wires will be required for each, thus an eight segment arm will require 24 control wires in all, with a separate actuator control for each.

In a further aspect of the present invention an external sleeve may be provided about each segment and in a particular embodiment of the invention, this sleeve may be a bellows-type sheath. The use of such a sheath has a number of advantages in that it increases the tortional/bending stiffness of the links. This is particularly beneficial since it is possible using the appropriate construction of bellows sheath to increase the tortional stiffness of the arm with very little increase In bending stiffness.

An additional benefit of the sheath is to protect the wires and other components from external causes of damage and enables the complete segment to be filled with a lubricant. Typical lubricants may be either dry powder or a liquid such as grease and/or oil. The physical characteristics of the lubricant incorporated in the arm may be selected according to the environment in which the arm is to operate. A particular feature of this embodiment is that as the arm flexes the geometrical shape of the interstices between adjacent links changes and this has the effect of displacing or "pumping" lubricant from one area of the segment to another and ensures a positive lubrication of the components due to the circulation of the lubricant within each segment. In another aspect, the arm may be provided with a lubricant reservoir and lubricant may be pumped continuously through the arm and recycled back to the reservoir. This embodiment is particularly useful where the arm is to be used in an aggressive environment and where cooling of the arm is required. In this case cooling means may be incorporated with the lubricant reservoir.

In one advantageous embodiment a robotic arm is provided comprising a first link and a second link positioned adjacent to each other to form a portion of the robotic arm. The first and second links are provided with a first aperture and a second aperture respectively extending therethrough. The robotic arm further comprises at least one cable extending through the first and the second opening. The robotic arm is provided such that the first and second links are configured where the cable remains in contact with at least a part of the first aperture and the second aperture at a boundary of each aperture through which the cable passes.

In another advantageous embodiment a robotic arm is provided comprising a first link and a second link positioned adjacent to each other to form a portion of the robotic arm. The first and second links have a first and a second aperture respectively extending therethrough. The robotic arm further comprises at least one cable extending through the first and the second aperture. The robotic arm is provided such that the first aperture is offset from the second aperture where the cable contacts a first side of the first aperture and the cable contacts a second side of the second aperture, wherein the first side is positioned substantially opposite to the second side.

In still another advantageous embodiment a robotic arm is provided comprising a first link and a second link positioned adjacent to each other to form a portion of the robotic arm. The first and second links have a first and a second aperture respectively extending therethrough. The robotic arm further comprises at least one cable extending through the first and the second aperture. The robotic arm is provided such that the first aperture is inclined with respect to the axis of the arm and the second aperture inclined with respect to the axis of the arm.

Other objects of the invention and its particular features and advantages will become more apparent from consideration of the following drawings and accompanying detailed description.

BRIEF DESCRIPTION OF THE DRAWINGS

FIGS. 1a to 1c are cross-sectional side views of a section of a robotic arm according to the prior art;

FIG. 2 is a perspective view of a section of a robotic arm according to one embodiment of the invention;

FIG. 11 is an end view of a link element or a half link element of FIGS. 9 and 10; and FIG. 11a is a cross-section on the line A-A of FIG. 11.

FIG. 12 is a perspective view of an end cap showing the ferrule attachment assembly at a remote end of a segment.

DETAILED DESCRIPTION OF THE INVENTION

Figure 3:
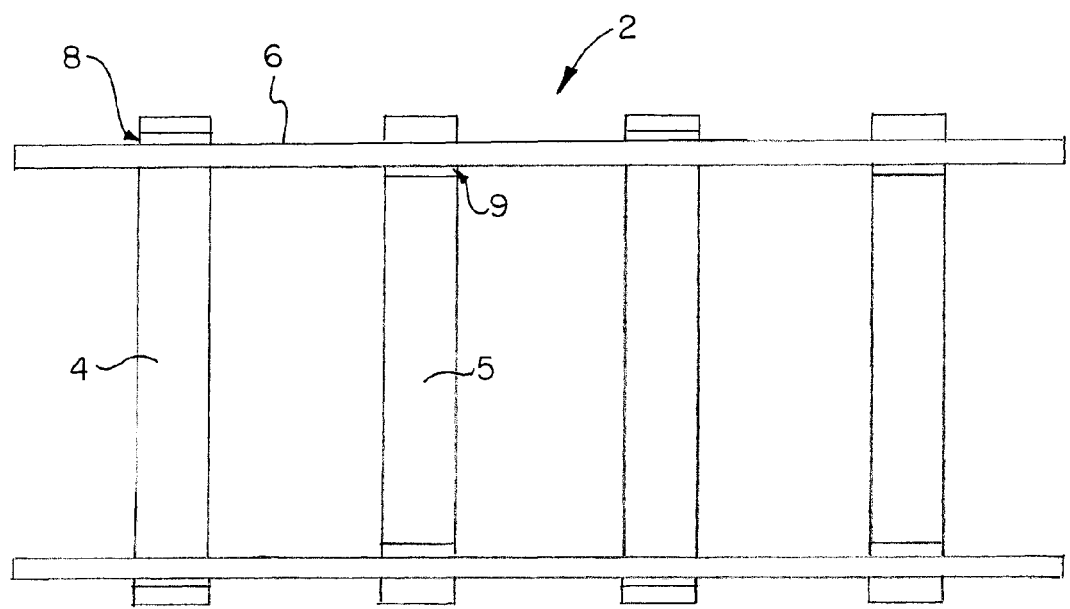
FIG. 3 is a cross-sectional side view of the arm of FIG. 2.

Referring now to the drawings, wherein like reference numerals designate corresponding structure throughout the views.

Referring to FIGS. 1a to 1c, the same section of a robotic arm 20 is shown, which comprises a base link 22, a mid-segment link 24, and a segment tip link 26, having articulated joints 28 therebetween. A control cable 30 is shown extending from the proximal end of the arm through the base link 22 and the mid-segment link 24 and terminating at the segment tip link 26. It can be seen that changing the length of the cable 30 alters the position of the tip link 26 to bend the segment of the arm. One or two further similar cables 30 may also be provided arranged around the circumference of the links, but these have been omitted for simplicity.

In each of the FIGS. 1a, 1b and 1c, the length of the cable 30 is constant. However, because the cross-sectional size of the apertures is larger that the cross-sectional size of the cable 30, the boundaries or walls of the apertures 32 are not necessarily in contact with the cable 30. In the case of the mid-segment link 24, the cable 30 is not imparting a force onto the link 24, such that it can rotate about a horizontal axis and adopt a position either turning to the left as shown in FIG. 1a, or turning to the right as shown in FIG. 1c, or being straight as shown in FIG. 1b. Furthermore the cable 30 may move between a position contacting the left hand side of the aperture 32 in the base link 22 as shown in FIG. 1a, to a position contacting the right hand side of the aperture 32 in the base link 22 as shown in FIG. 1c. Thus the positions of the links 22, 24, 26 in relation to each other and the state of contact between the apertures 32 and the cable 30 are indeterminate over a range of motion.

Referring to FIGS. 2 and 3, the arm 2 according to the invention comprises 25 sequentially arranged links 4, 5. The links 4, 5 are articulated with respect to each other by bearings (not shown) to allow relative movement therebetween to bend the arm. The arm 2 comprises control cables 6 passing through apertures 8 arranged around the circumference of each link 4, 5.

As can clearly be seen from FIG. 3, the apertures 8 formed in one set of 5 alternate links 4 are located slightly further radially outwardly in relation to the apertures 9 in the other set of alternate links 5. Thus the cables 6 are retained against the radially inward boundary or wall of the aperture 8 in the link 4 of the first set, and against the radially outward boundary or wall of the apertures 9 in the link S of the other set. The apertures 8, 9 are larger than the cable diameter, for ease of assembly of the arm.

It will therefore be understood that the positions of the links 4, 5 can be more accurately determined than in the prior art case, since they are constrained by the cables 6. Also the state of contact between the cables 6 and the links 4, 5 is known. This means that the computer control system operating the arm is better able to model the shape of the arm and the positions of the links 4, 5 so that the arm may be more accurately controlled. Furthermore, the links 4 and 5 are better constrained against uncontrolled movement.

Figure 4:
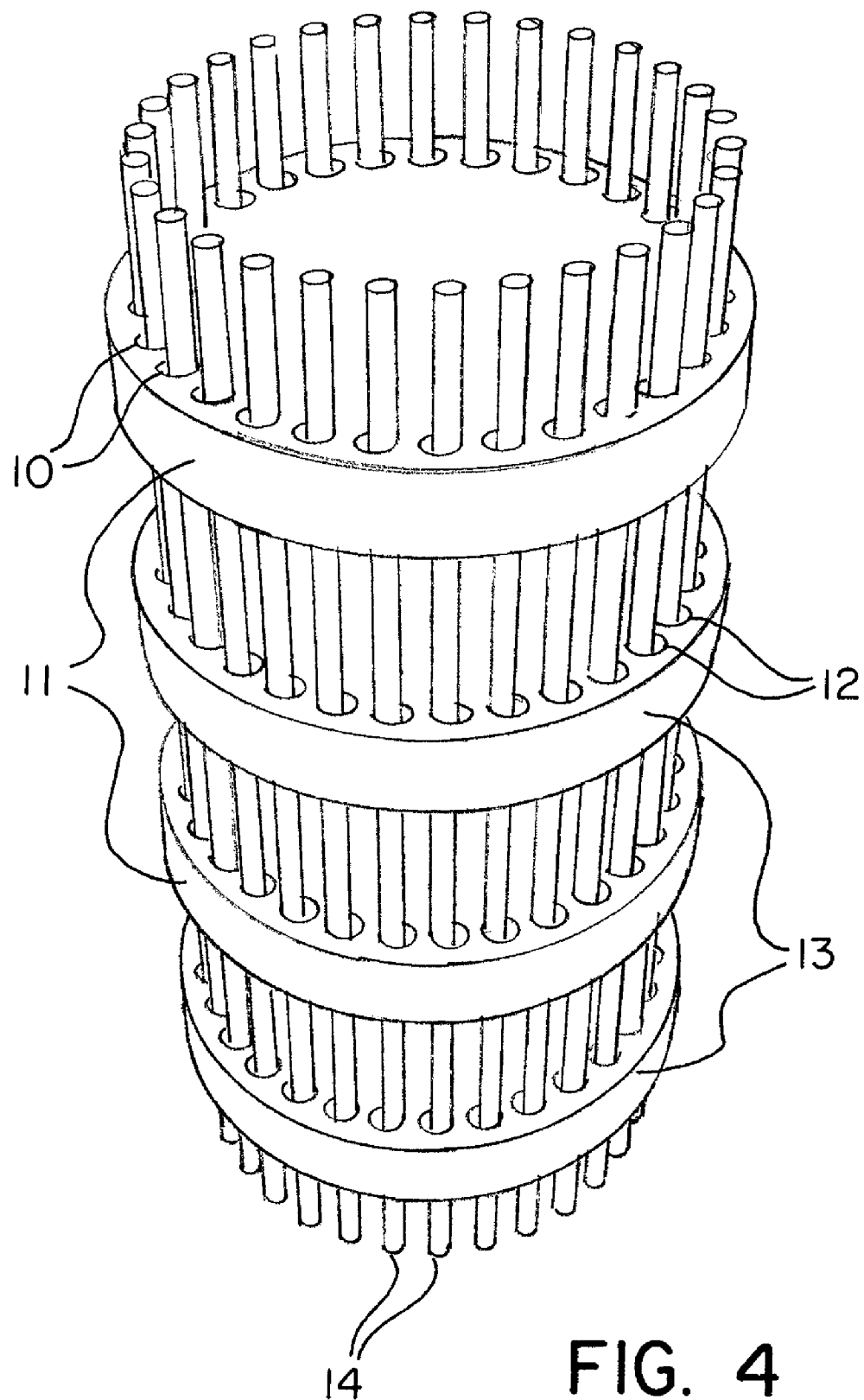
FIG. 4 is a perspective view of a section of robotic arms according to another embodiment of the invention.

In another arrangement shown in FIG. 4, the apertures 10 in a first set of alternate links 11 are offset circumferentially from the apertures 12 in the second set of alternate links 13. With this arrangement, the cables 14 bear alternately against the left sides or the right sides of the apertures 10, 12 through which they pass.

Figure 5:
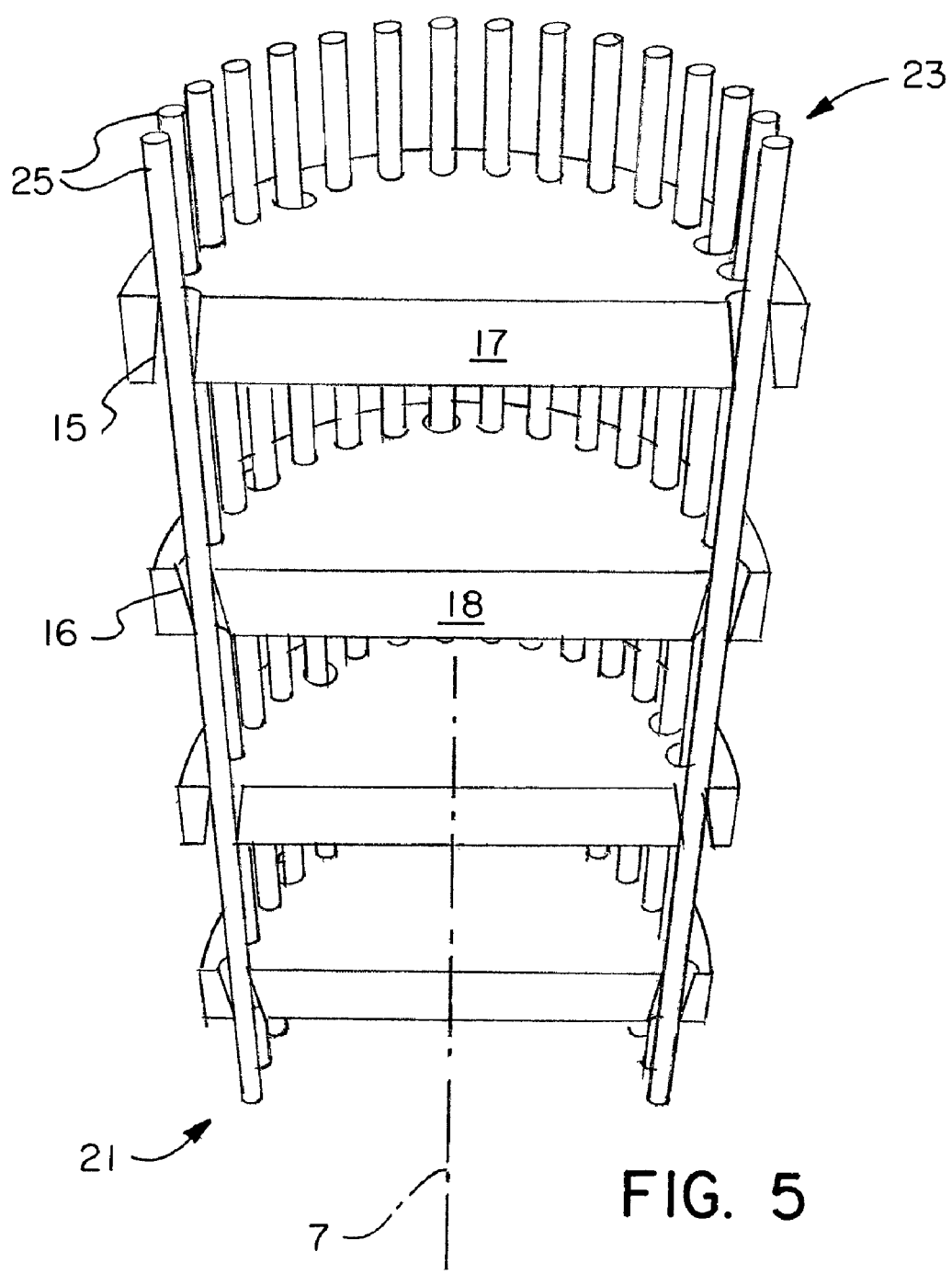
FIG. 5 is a perspective view of a section of a robotic arm according to a further embodiment of the invention.
Figure 6:
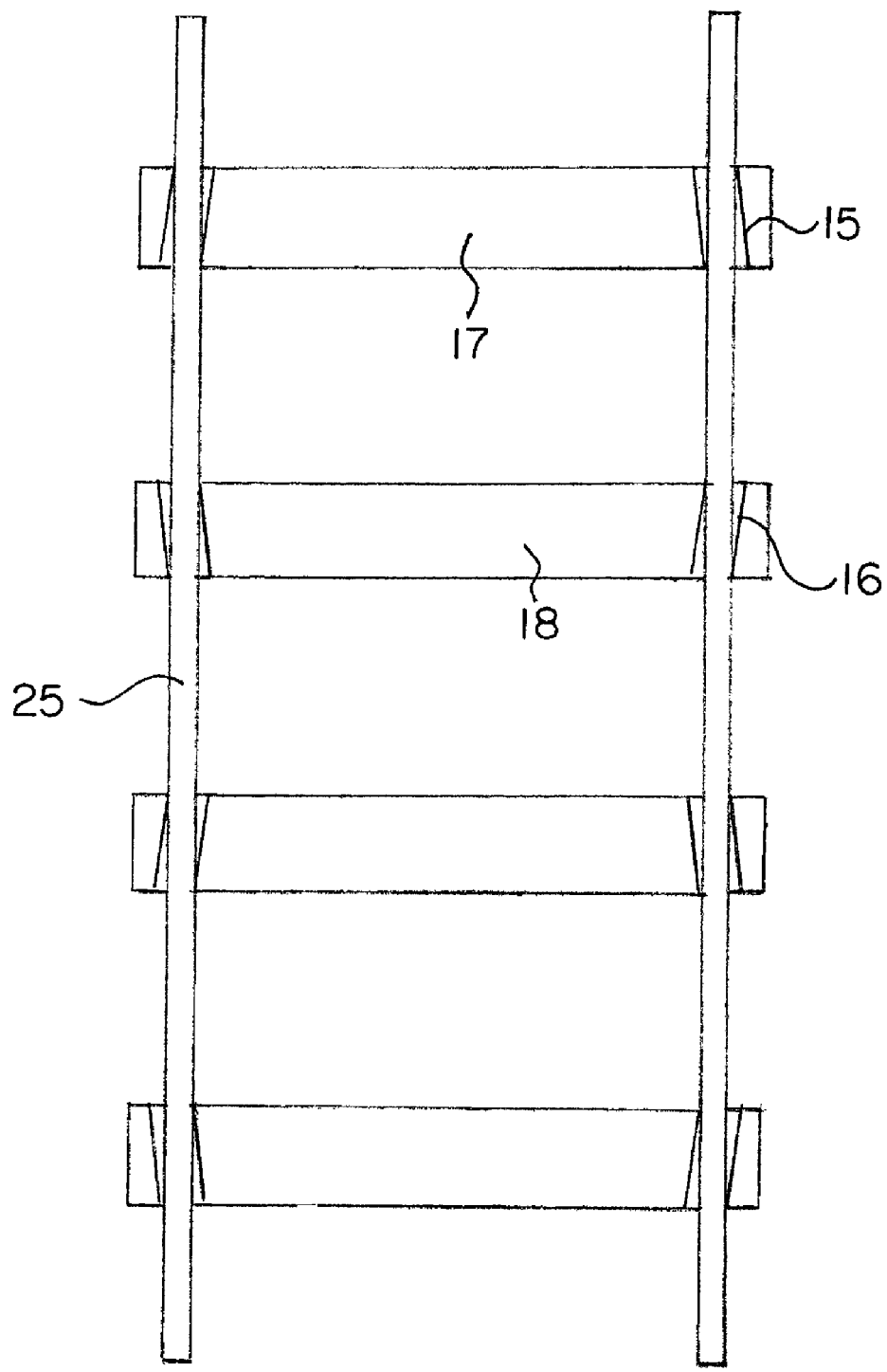
FIG. 6 is a cross-sectional side view of the arm of FIG. 4.

In another possible arrangement as shown in FIGS. 5 and 6, the apertures 16, 18 in the links 17, 19 are angle with respect to the axis of the arm. In the first set of links 17, the apertures 15 are angled radially inwardly from the proximal end 21 to the distal end 23, whilst in the second set of alternate links 18, the apertures 16 are angled radially outwardly. Thus each cable 25 bears against both the lower end and the upper end of each aperture 15, 16.

Whilst it has been shown that the cables in these examples are straight when the arm is straight, it may be the case that the offset is slightly larger than shown, such that the cables for example take up a zig-zag shaped path through the links.

Figure 7:
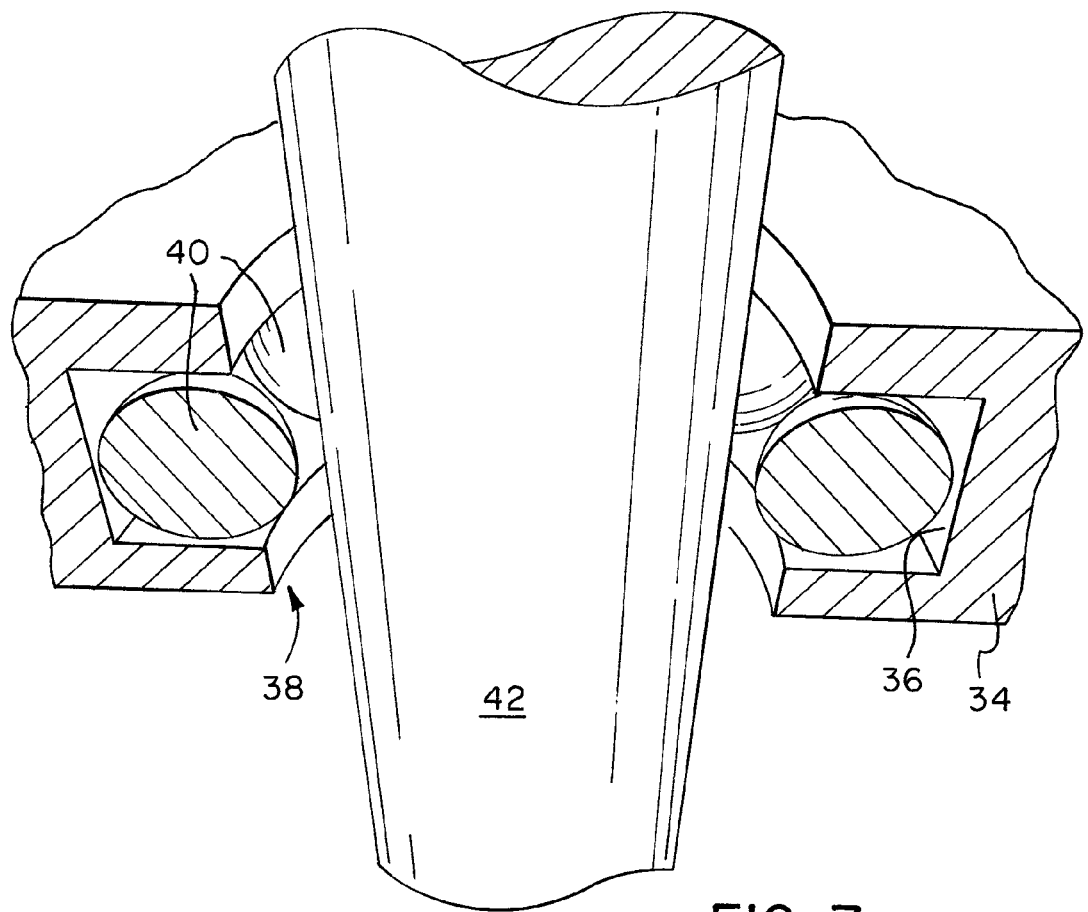
FIG. 7 is a perspective cross-sectional side view showing a cable in an arm aperture.

It will be appreciate that, if the cables bear tightly against the walls of the apertures, this may increase the friction in the system. An approach to reducing friction is shown in FIG. 7. The link 34 comprises a ball race 36 around the aperture 38 which mounts bearing balls 40. This so-called nano bearing allows the cable 42 to run more freely through the aperture 38.

Figure 8:
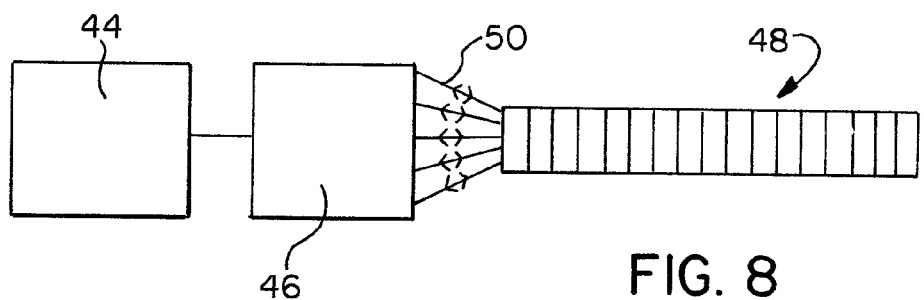
FIG. 8 is an illustration of a computer control system that controls a set of actuators for the cables leading to the control links of the arm.

An alternative approach is to produce relative movement between the cables and the links to release frictional adherence. For example, the actuators may be used to produce a small oscillating movement in addition to the control of movement of the cables. As shown in FIG. 8, the computer control system 44 controls a set of actuators 46 for the cables 50 leading to the control links of the arm 48. In addition to playing out or winding in the control cables 50 in order to control the arm shape, there may also be a small oscillating axial movement of the cables, or "dither" movement, as shown by the arrows in FIG. 8.

In another embodiment, an arm comprises a plurality of segments indicated generally at 110 arranged end-to-end to form an extended "snake" arm. Each segment comprises a plurality of link components indicated generally at 111. Each link component comprises an inner disc 112 and an outer disc and wire guide 113. The inner disc 112 is shaped to provide an arcuate annular surface indicated generally at 114 and the outer disc 113 has a matching arcuate surface 115.

Figure 9:
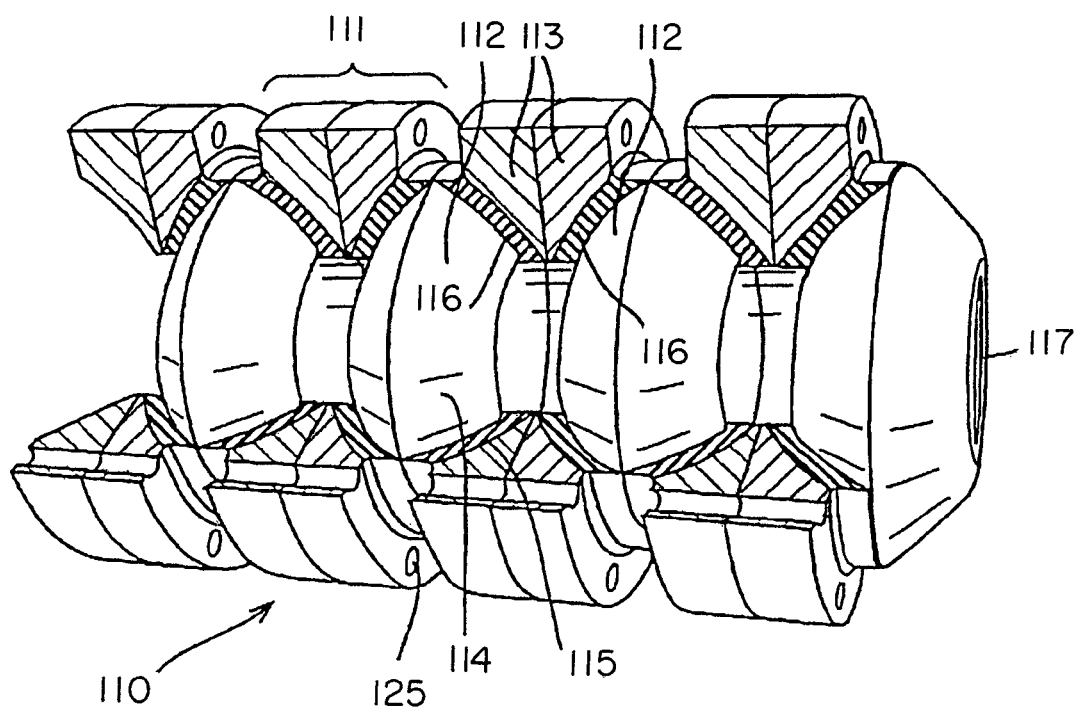
FIG. 9 is a perspective view of a plurality of links in a segment.
Figure 10:
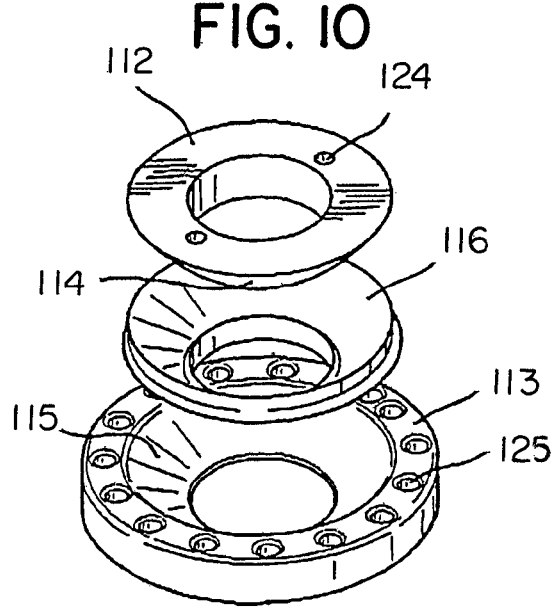
FIG. 10 is an exploded diagrammatic view of a "half" link of FIG. 9.

Assembled as shown in FIG. 9, the inner disc 112 and the outer disc 113 are separated by a layer of rubber 116, which may be formed in situ. The rubber layer 116 is bonded to each of the outer disc 113 and the inner disc 112 to allow relative movement therebetween. Each inner disc is provided with a central bore indicated generally at 117 to define a central 120 lumen through the centre of the device to accommodate a power supply and control mechanism for a work head at an extremity of the arm. Each link 111 may be formed from a pair of "link halves", which are best indicated in FIG. 10. Each link half comprises an outer link member 113, an inner link member 112 and a rubber disc or shell 116 adapted to be inserted between the two. The components may be bonded together to form a half link portions which may then be joined together with adjacent components to form the continuous segment of links. It will be noted that the concave surface 121 of outer link element 113 is adapted to cooperate with the corresponding under surface (as shown in FIG. 10) of element 112. The disc 116 is shaped to be accommodated between the two and the components may be bonded together. This can be best seen from FIG. 11A which shows a section through the bonded components.

In one aspect of the invention, the outer disc and wire guide 113 is provided with a plurality of circumferentially spaced dowel holes 123 while the inner disc 112 is also provided with correspondingly spaced diametric dowel holes 124. When the assemblies are placed together with dowel pins located in holes 123 and 124 respectively, it will be appreciated by the person skilled in the art that if the assembly is then maintained under tension by the control wires, permanent fixing will not be necessary. The outer disc 113 is provided with a plurality of through bores 125 adapted to constitute wire guide holes to accommodate the control wires for the device.

Each segment may be provided with an end cap 130 (see FIG. 12), which is provided with peripheral spaced wire accommodating holes and with an enlarged recess 126 including a ferrule 127 affixed to the end of a control wire 128. In assembling the device, the end cap 130 is secured to the adjacent outer disc portion 113 of the end link and the control wires 126 are threaded through the appropriate recess 126 in the end cap 130 and then through mating holes 125 in each of outer disc portions 113 for each link in the segment.

Several segments are then joined end to end to produce an arm of the appropriate length for the intended purpose. This "snake-like" arm has the ability to be manipulated to flow axially along its length and to follow a convoluted path in the manner of a snake.

Figure 13:
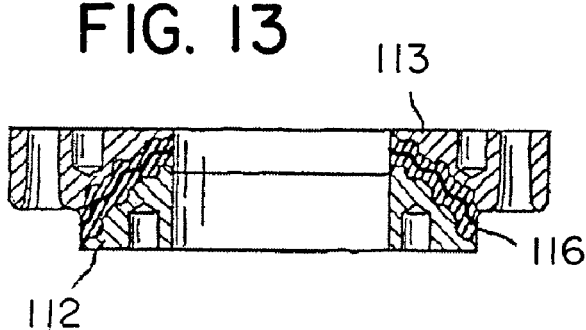
FIG. 13 is a cross-section on the line A-A of FIG. 14.
Figure 14:
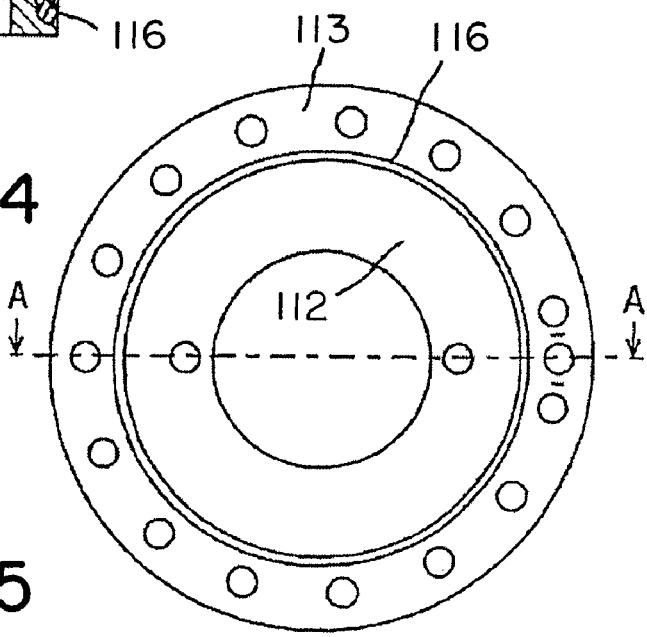
FIG. 14 is an end view of an alternative embodiment.
Figure 15:
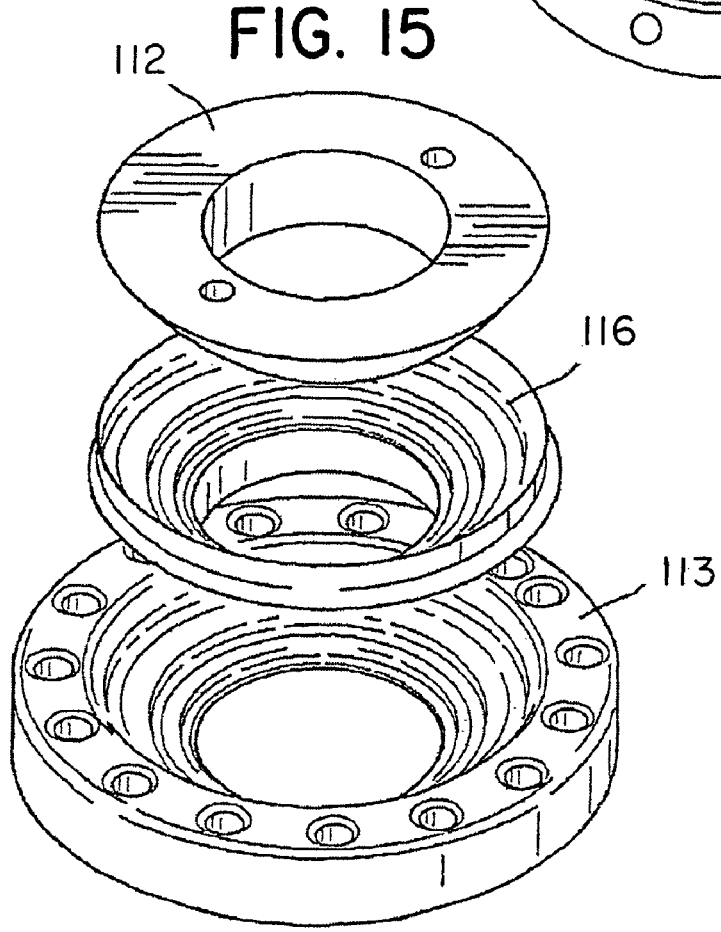
FIG. 15 is an exploded diagram of a "half" link of the embodiment of FIGS. 13 and 14.

The ends of the wires are passed back to actuators and are tensioned until the ferrule 127 is brought against the back plate to maintain the assembly under tension. By tensioning the assembly in this way, it is possible to avoid the bonding of the components shown in FIGS. 13, 14 and 15, the mating faces of the inner and outer discs may be appropriately grooved to accommodate a correspondingly profile rubber disc 116. These grooves or profiling serves to key the disc 116 in position between the inner and outer discs 112 and 113 respectively and yet allows for movement of one with respect to the other in response to changes in tension in the control wires 128. This avoids the need for bonding of the discs and allows for relatively easy replacement of damaged components within any given segment.

In the assembled segment, the outer surfaces of the discs and the control wires may be sealed and the resultant cavity and wire guides filled with a lubricant so that the control wires run in a lubricated environment. This again, serves to reduce loss and friction in service.

Figure 16:
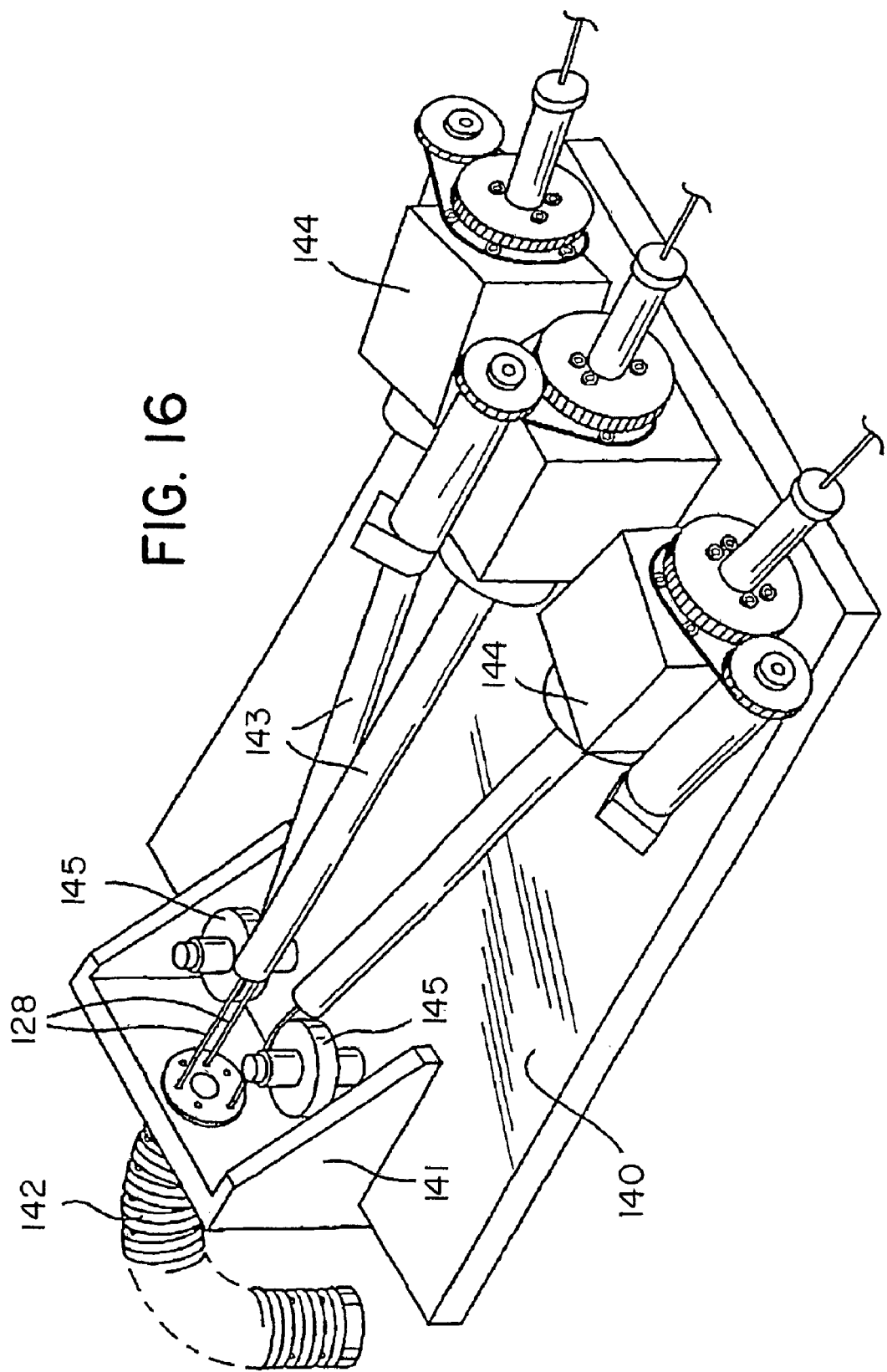
FIG. 16 is a headboard showing a three-actuator arrangement for a single segment.

Adjusting the tension on each of the wires may control the operation of each segment. FIG. 16 shows a simplified three-actuator control board that comprises a base member 140 having towards one end thereof an upstanding mounting plate assembly 141 adapted to mount an end plate of a segment 142. Control wires 128 extend through the mounting plate assembly 141 to the operating tubes 143 of each of actuators 144. The center actuator 144 provides a direct feed for wires 128 from the segment to the actuator per se while those on either side of the center operate via means of pulleys 145 to minimize any friction or wear in operation. Additionally, friction may be dissipated by movement of the cables by means of a control system arranged to produce movement of cables. The movement may be in the axial or circumferential direction, or may be rotational movement controlled by, for example, the cable control system as shown in FIG. 16.

Each of actuators 144 may be controlled either manually or by computer to vary the tension in the three wires 128. Depending on the variants in the tension the individual links will seek to move in response to the changing tension in the wires thereby producing movement in the segments to permit guidance of the segment end to a given location in the work place.

Figure 17:
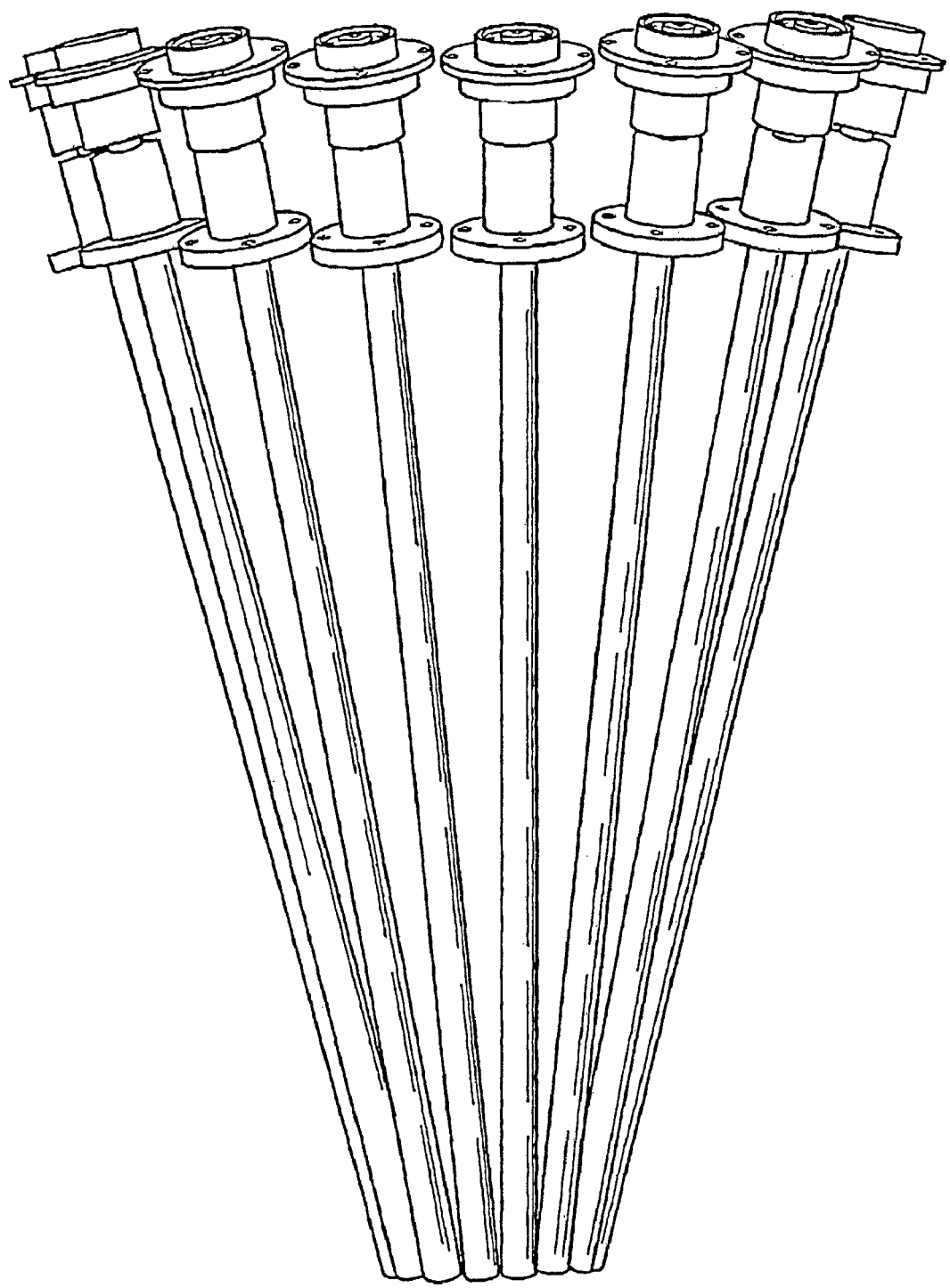
FIG. 17 is a frustocone arrangement for a plurality of actuators for controlling control wires for a robotic arm having a plurality of segments.

For multiple segments in an extended "snake" arm, of course, many more actuators will be required, usually three per segment. In these circumstances, it is necessary to structure the actuators to provide access to the control wires at their exit from the end of the first segment in a relatively small space. Accordingly, the actuators may be arranged in an arc so that the control wires or conduits containing them for each actuator define a cone rather as shown in FIG. 17.

The rubber discs 116 may be a single piece of rubber or may be in the form of a composite rigid layer elastomer and the present applicants have found that the thinner the individual layers of rubber, the more efficient is the eventual layer and the stiffer the joint between the inner disc and the corresponding outer disc.

Figure 18:
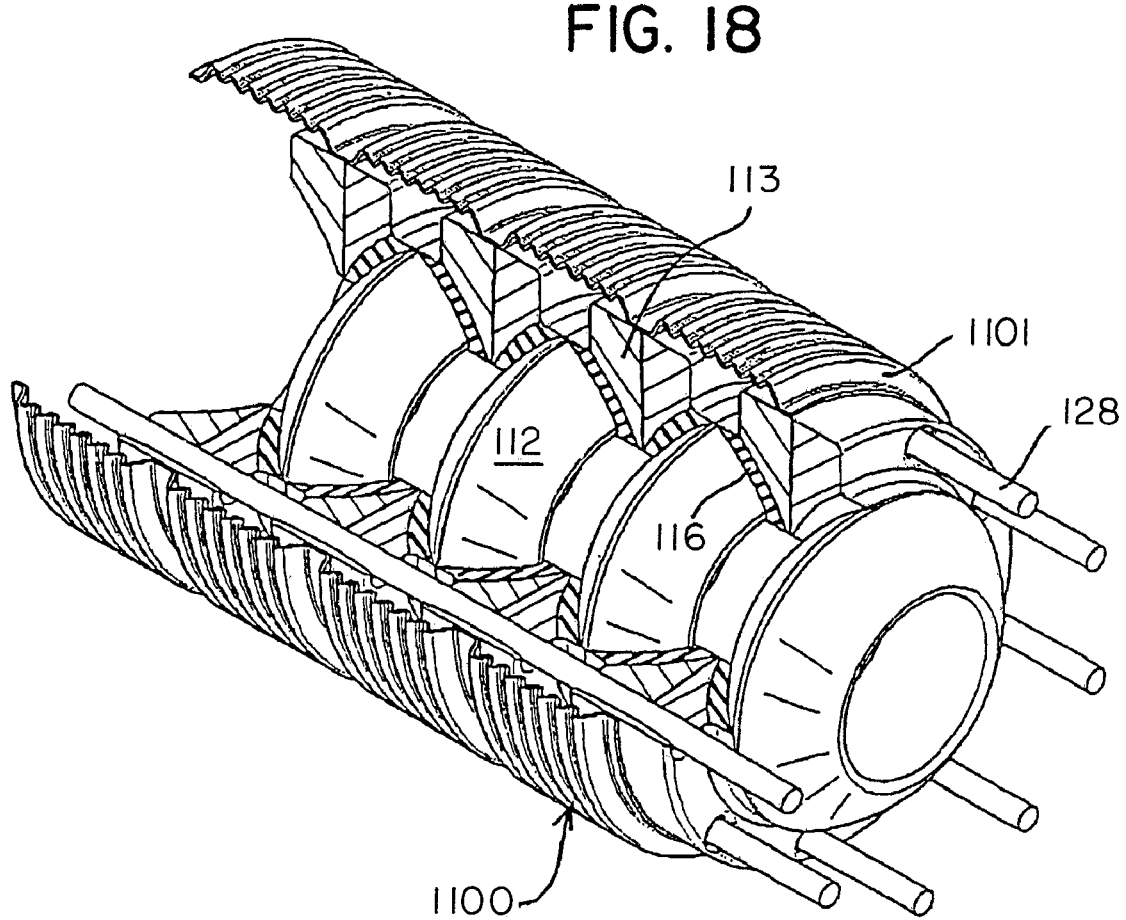
FIG. 18 is a perspective view of sheathed segment for an arm in accordance with the present invention.

The apparatus also provides a sealing of the bearing surfaces between the inner and outer discs and prevents the ingress of injurious matter from the atmosphere (see FIG. 18).

Furthermore, the central bore or lumen 117 is effectively sealed and provides ready access for power supply and control means for a work head at the end of the robotic arm.

The sealing may be affected by sheathing 200, which is provided with circumferential corrugations 201. This sheathing 200 extends externally of the outer surface of each of the outer discs and wire guides 113. The sheathing 200 seals the interstices between each of the outer discs and wire guides 113, and the sheath are filled with oil or other lubricant thereby permitting the control wires to operate in a lubricant environment. Suitable lubricants may comprise oils, powders and greases the viscosity and other physical characteristics of which will be selected according to the environment in which the arm is to be employed.

The use of a sheath 200 having a bellows-type structure has the effect of increasing the torsional and/or bending stiffness of the links one to another. This can result in a significant increase in the torsional stiffness of the arm with very little increase in bending stiffness. The arrangement serves to protect the wires and other components from external causes of damage.

The containment of lubricant by the sheath 100 has a major advantage in operation. As described above, as the segment bends, adjacent peripheries of the outer discs and wire guides 113 move closer together whereas the diametrically opposite portions of the same discs 113 move apart. As a result, the cavity containing the lubricant changes shape from a toroidal cavity of generally continuous and substantially uniform cross-section to a "wedge" shape. This causes lubricant from the inside or "narrow" side of the wedge to be displaced and effectively pumped to the "wide" side of the wedge on the outer part of the curve. In doing so, the lubricant passes by and over the various wires. Each time the segment flexes, therefore, or each time the plane of curvature changes, this pumping effect serves to provide positive lubrication of the components within the arm and in particular of each wire.

It will be appreciated that the lubricant can be introduced into the arm in a number of different ways. In one embodiment, the cavities may be filled with lubricant on assembly and be effectively sealed for life. In an alternative embodiment, individual links or segments of the arm may be isolated and the lubricant introduced through access points such as, for example, grease nipples with excess lubricant being released through an additional port or pressure release valve. In a further aspect of the invention, the whole arm may be lubricated as a unitary whole using the wire holes in the outer links to pass lubricant along the entire length of the arm. Liquid lubricant may be pumped continuously through the arm and recycled back to a central reservoir. Such an arrangement will allow for temperature control of the lubricant in the arm by either heating or cooling the lubricant and the present invention includes the provision of temperature control means for liquid lubricant within the arm.

Although the invention has been described with reference to a particular arrangement of parts, features and the like, these are not intended to exhaust all possible arrangements or features, and indeed many other modifications and variations will be ascertainable to those of skill in the art.

What is claimed is:
1. A robotic arm comprising:
 a first link and a second link positioned adjacent to each other to form a portion of the robotic arm, said first link and said second link having a first and a second aperture respectively extending therethrough, the first aperture and the second aperture each have a first side and a second side;

at least one cable extending through the first and the second aperture, wherein said cable has a smaller diameter than said first aperture and said second aperture so that the cable can be fed through the apertures;

said first aperture is offset from said second aperture such that said cable contacts only the first side of said first aperture and said cable contacts only the second side of said second aperture, wherein said first side is positioned substantially opposite to said second side.

2. The robotic arm according to claim 1 comprising a material that reduces a coefficient of friction between said first aperture and said cable, wherein the material is provided either on the aperture or on the cable.

3. The robotic arm according to claim 1 further comprising an elastomer positioned between said first link and said second link.

4. The robotic arm according to claim 1 further comprising a third link positioned adjacent to said second link, said third link having a third aperture through which said cable passes, wherein said cable remains in contact with only a first side of the third aperture.

5. The robotic arm according to claim 1 wherein said first aperture and said second aperture are offset with respect to each other, either in the radial or in the circumferential direction.

6. The robotic arm according to claim 1 wherein said boundary of each aperture comprises a bearing.

7. The robotic arm according to claim 1 further comprising an actuator associated with said cable for producing movement of the cable, and a control system arranged to operate the actuator to control a position of the arm.

8. The robotic arm according to claim 7 wherein said control system is arranged to produce oscillating movement of cables, for reducing frictional adherence between said cable and said aperture.

9. The robotic arm according to claim 8 wherein said control system produces circumferential or rotational movement of the cable.

10. A robotic arm having an axis, comprising:
a first link and a second link positioned adjacent to each other to form a portion of the robotic arm, said first link and said second link having a first and a second aperture respectively extending therethrough;
at least one cable extending through the first and the second aperture, wherein said cable has a smaller diameter than said first aperture and said second aperture so that the cable can be fed through the apertures;
said first aperture having a central longitudinal axis that is inclined with respect to the axis of the arm and said second aperture also having a central longitudinal axis that is inclined with respect to the axis of the arm.

11. The robotic arm according to claim 10 wherein the central longitudinal axis of said first aperture and the central longitudinal axis of said second aperture are inclined in alternately opposite directions.

12. The robotic arm according to claim 10 comprising a material that reduces a coefficient of friction between said first aperture and said cable, wherein the material is provided either on the aperture or on the cable.

13. The robotic arm according to claim 10 further comprising an elastomer positioned between said first link and said second link.

14. The robotic arm according to claim 10 further comprising an actuator associated with said cable for producing movement of the cable, and a control system arranged to operate the actuator to control a position of the arm.

15. The robotic arm according to claim 14 wherein said control system is arranged to produce oscillating movement of cables, for reducing frictional adherence between said cable and said aperture.

16. The robotic arm according to claim 15 wherein said control system produces circumferential or rotational movement of the cable.

* * * * *